United States Patent

Grichnik

Patent Number: 5,854,993
Date of Patent: Dec. 29, 1998

[54] COMPONENT MACHINE TESTING USING NEURAL NETWORK PROCESSED VIBRATION DATA ANALYSIS

[75] Inventor: Anthony J. Grichnik, Peoria, Ill.

[73] Assignee: Caterpillar Inc., Peoria, Ill.

[21] Appl. No.: 763,965

[22] Filed: Dec. 10, 1996

[51] Int. Cl.[6] .................................................. G01M 7/00
[52] U.S. Cl. ................................ 702/54; 395/21; 395/22; 73/581
[58] Field of Search ................................... 395/22, 21, 23; 364/508, 474.17; 73/581, 602, 609, 611, 649; 702/54

[56] References Cited

U.S. PATENT DOCUMENTS

| | | | |
|---|---|---|---|
| 5,313,407 | 5/1994 | Tiernan et al. | 364/508 |
| 5,333,240 | 7/1994 | Matsumoto et al. | 395/23 |
| 5,361,628 | 11/1994 | Marko et al. | 73/116 |
| 5,419,197 | 5/1995 | Ogi et al. | 73/659 |
| 5,426,720 | 6/1995 | Bozich et al. | 395/22 |
| 5,566,092 | 10/1996 | Wang et al. | 364/551.02 |
| 5,566,273 | 10/1996 | Huang et al. | 395/23 |
| 5,579,232 | 11/1996 | Tong et al. | 364/474.17 |

*Primary Examiner*—Thomas Peeso
*Attorney, Agent, or Firm*—Alvin J. Riddles

[57] ABSTRACT

A component machine testing technique is provided that performs diagnostic analysis on a vibration signal of the component machine that has been separated from power and load machine background noise in a first neural network. The diagnostic analysis, with operator direction through an interactive interface, uses a second neural network in performing a series of diagnostic operations followed by archival of any experience acquired in the testing operation being performed.

In the diagnostic analysis, both time based and frequency based vibration signal information from the component machine under test are used together through a simultaneous multiple display interactive interface under operator direction.

15 Claims, 4 Drawing Sheets

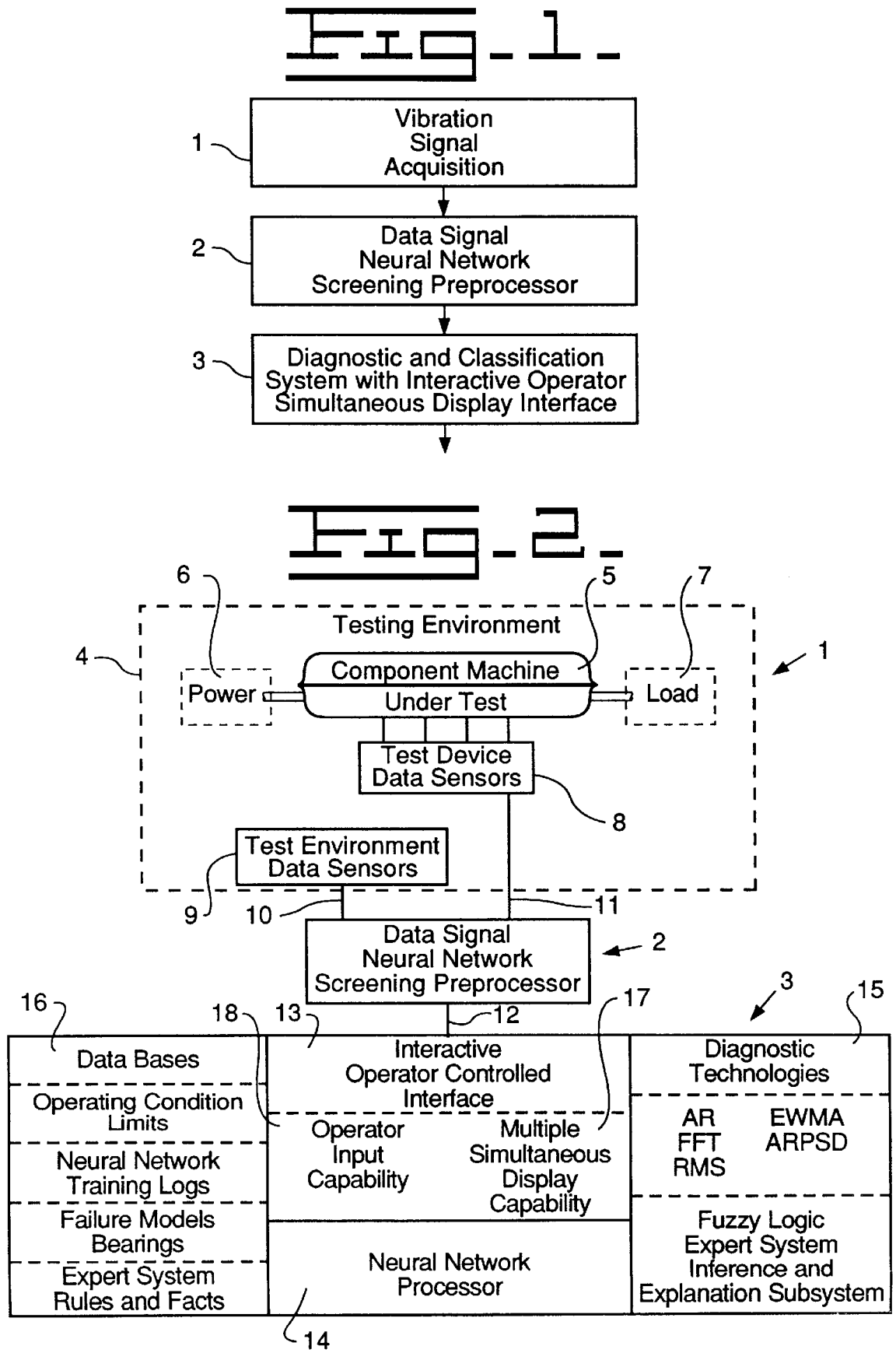

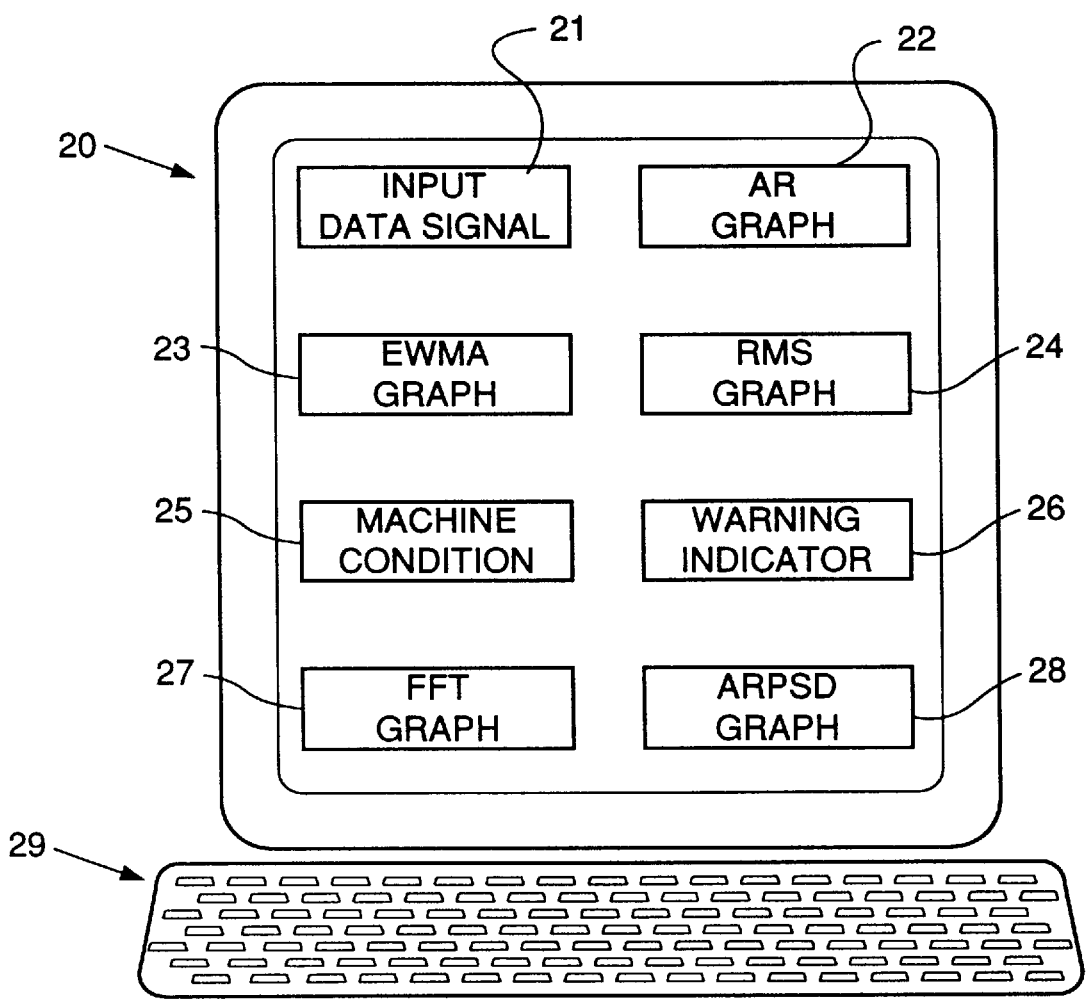

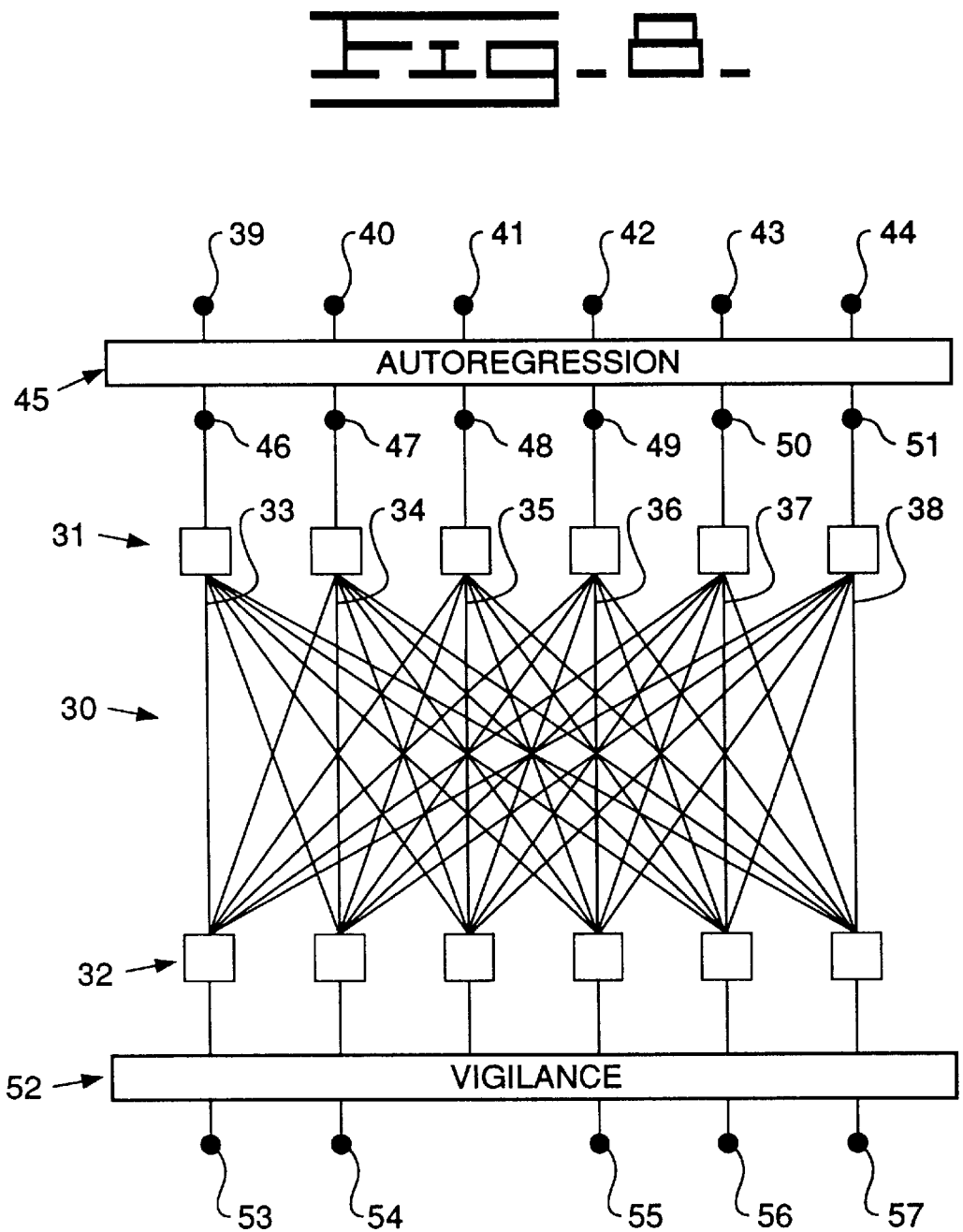

COMPONENT MACHINE TESTING USING NEURAL NETWORK PROCESSED VIBRATION DATA ANALYSIS

TECHNICAL FIELD

The invention relates to the diagnostic and evaluation testing of a component machine such as a transmission that in turn is a part of a larger machine entity such as a vehicle; and in particular, to a testing system using neural network processing of vibration data with evaluation and experience retention through an interactive user interface.

BACKGROUND ART

The diagnostic and evaluation testing of a component machine, such as a transmission, that is part of a larger machine entity, involves a number of unique considerations.

The component machine itself is usually a complex apparatus containing an intricate arrangement of parts sealed up in a lubrication containing housing. The housing and lubrication may attenuate and distort vibration data signals. The component machine itself is generally large and heavy so that merely moving it into a testing environment is a significant effort.

Under test, the machine component must be supplied with variable power and load over the designed operating range. This produces a situation where the vibration signals from the component machine that are to be analyzed are contained within a noise band that is produced by any testing power and load mechanisms and which make difficult the useful component machine vibration signal extraction.

The actual testing operation may occur under many different sets of conditions, for example, it may occur in a manufacturing environment where the component machine is being made, it may occur at a repair depot in the vehicle or independent of the vehicle, or it may occur mounted in the larger machine entity in the field. It is of advantage to be able to interrupt the testing any time the goal of the particular testing operation has been achieved.

In the testing, once test conditions are established, it would be desirable to be able to test for whether the performance of the component machine apparatus is satisfactory; and to identify any location in the component machine being tested that is responsible for any deviation from satisfactory performance.

Neural network vibration signal analysis has been used in the art to identify and diagnose problems with rotating machinery. Particularly, the use of neural network vibration analysis has been employed in the machine diagnostics art. As an example, in U.S. Pat. No. 5,361,628, diagnostic testing and classification of automobile engines is described using a neural network with subsampling and filtration for reduction of a vibration signal band in order not to overload a neural network.

The invention developed out of a continuing effort involving machine vibration analysis via a neural network set forth in the following U.S. patent applications owned by the assignee of the present invention and incorporated herein by reference.

U.S. patent application Ser. No. 08/176,456, filed Dec. 30, 1993, entitled "Machine Performance Monitoring and Fault Classification Using an Exponentially Weighted Moving Average" naming as inventors Julie M. Spoerre, Chang Ching Lin, and Hsu Pin Wang.

U.S. Pat. No. 5,566,092, issued Oct. 15, 1996, entitled "Machine Fault Diagnostics System and Method" naming as inventors Hsu Pin Wang, Hsin-Hoa Huang, Gerald M. Knapp, Chang Ching Lin, Shui-Shun Lin and Julie M. Spoerre.

U.S. Pat. No. 5,566,273, issued Oct. 15, 1996, entitled "Supervised Training of a Neural Network" naming as inventors Hsin-Hoa Huang, Shui-Shun Lin, Gerald M. Knapp and Hsu Pin Wang.

As an art progresses, the complexity of the testing required to classify and to identify problems in physically larger, heavier and more complex component machines is producing a need for a more comprehensive component machine evaluation system.

DISCLOSURE OF THE INVENTION

A component machine testing technique is provided that can identify whether performance specifications are met and can perform diagnostic analysis on a vibration signal of the component machine. The testing technique separates the influence of power and load machine background noise from the vibration signal of the component machine under test in a first neural network under operator analysis. A diagnostic analysis, with further operator direction through an interactive interface, uses, with a second neural network, a hypothesis advancement system and a previous experience based expert system to direct repair type action guidance. There is archival of any experience acquired in the testing operation being performed for future testing use.

In the diagnostic analysis, both time based and frequency based vibration signal information from the component machine under test are used together through a simultaneous multiple signal feature display interactive interface under operator direction.

A first neural network unit is employed in which an input signal pattern enters an input-output cross connected neural network, with the input layer subjected to auto-regression parameter limit control, with the output layer subjected to vigilance control and wherein the network unit resonates up to the point where the vigilance control level accepts a signal that is free of the influence of background noise and is passed on for diagnostic analysis.

The diagnostic analysis employs a second neural network that compares the vibration signal pattern with known failure patterns, with known types of common fault failure patterns and with the rules and facts of an expert system.

BRIEF DESCRIPTION OF THE DRAWINGS

FIG. 1 is a functional flow chart of the testing system of the invention.

FIG. 2 is a block diagram of the elements and features of the diagnostic and classification system of the invention.

FIG. 7 is a depiction of the interactive operator controlled interface of the invention.

FIG. 8 is a depiction of the background noise extraction vibration signal neural network unit of the invention.

BEST MODE FOR CARRYING OUT THE INVENTION

Figure 3:
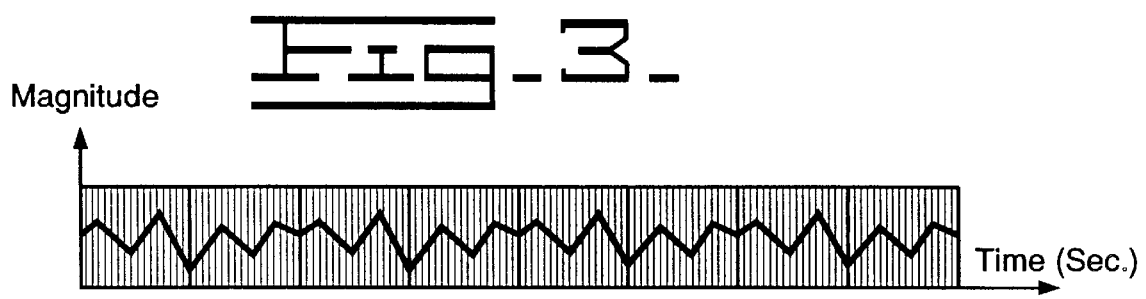
FIG. 3 is a depiction of a typical magnitude vs time (in seconds) graph of a typical vibration data signal.

The testing system of the invention provides a testing capability for a component machine, such as a transmission. It operates on vibration data signals from the component machine that must be extracted from background vibration signals of the power and load related functions essential to operation of the component machine throughout the designed range.

It will provide capability for an initial, satisfactory or unsatisfactory, classification of the component machine. It will, on a component machine classified as unsatisfactory, further examine the vibration signal patterns to extract abnormal signal groups for defect identification of the component machine.

On an abnormal vibration signal pattern, the system of the invention will produce a recommendation on what defect of the component machine is causing the abnormal vibration signal pattern. The recommendation is first based on finding a match between the incoming signal pattern and signal patterns of known component machine component failures, that became known through previous component machine testing experience. If no match is found, the abnormal vibration signal pattern is further examined in a comparison with a group of hypothetical vibration signals developed from studies of common faults of component machines of the type under test. If the system of the invention is still unable to identify the abnormal signal pattern, an expert system capability will serve as a guide in making a judgment of the repair required for the component machine under test. Finally, a capability is provided that enables the archiving in the system of the invention, any learning from a present test that will assist in future diagnostics.

Referring to FIG. 1, there is shown a functional flow chart of the testing system of the invention wherein a first step, labeled element 1, the vibration signal data is acquired. The vibration signal data originates at a location that is within a background of noise. The background of noise is an essential by-product of the machinery that must provide the drive power and load for the functioning of the component machine that is under test.

In a second step, labeled element 2, the acquired data signal is subjected to a preprocessing operation, involving a first neural network that has the function in effect of removing the influence of the background noise so that it is seen as a normal situation in the data signals that represent the component machine under test. In a third step, labeled element 3, under the participating control of an interactive operator interface, the test data is processed. The testing permits the machine component under test to be initially classified as being satisfactory, and if not satisfactory, then having the unsatisfactory aspects of the machine component identified, and finally the identifiers that resulted in the unsatisfactory classification are archived for future testing on other machine components.

Referring to FIG. 2, there is shown a block diagram of the elements and features of the diagnostic and classification system with the interactive operator simultaneous display interface of the invention. In FIG. 2, a testing environment is shown in dotted outline as element 4 in which the component machine under test 5 is mounted under conditions that permit the range of capabilities of the component machine under test 5 to be evaluated. For a component machine 5, such as a transmission those conditions would be at least power and load, shown dotted as elements 6 and 7 and gear settings, not shown, and which are the source of some noise in the testing environment 4. A test device data sensor unit 8 is positioned adjacent to the test device 5, containing a plurality of sensors for vibrational data and operating conditions with symbolic connections to the test device 5. A test environment data sensor unit 9 is positioned within the test environment. In the absence of some unique noise source in the test environment 4, the test environment data sensor unit 9 will contain at least the same vibrational data sensors as those in the unit 8, which generally are transducers or accelerometers, such as the 328CO4PCB type in the art and used with a DT2821-G-8DI acquisition board in a standard personal computer, that measure vibration, sound, force, pressure, etc. and such other criteria as, for example, temperature and lubricant oil condition.

The data signal screening preprocessor 2 performs the function of using a first neural network in removing the influence of the background noise sensed in the environment sensor unit 9 from the test device data signal sensed by the device sensor unit 8. In the screening preprocessor 2, the signals of background noise via channel 10, are used in training a special first neural network unit to be described in connection with FIG. 8, to recognize as normal the signals via channel 10 when processing the test device data signals sensed in unit 8 and delivered via channel 11 so that the test device data signals when delivered on channel 12 are free of the influence of the background noise in the test environment.

In element 3 of FIG. 2, the features of the diagnostic and classification system with the interactive operator simultaneous display interface of the invention are depicted. The test device data signals are delivered via the channel 12 to and through the interactive interface 13 in which, under the control of the operator, the data signals are processed in a second neural network 14, employing diagnostic technologies 15; such as autoreduction (AR), fast fourier transform (FFT), root mean square (RMS) and exponentially weighted moving average (EWMA) and autoreduction power spectral density (ARPSD) along with an Expert system inference and explanation subsystem; that in turn use data bases 16; such as operating condition limits, neural network training logs, previous experience actual failure models, previous experience typical failure models and Expert system rules and facts.

In the actual testing operation the multiple simultaneous display capability feature 17 of the interface 13, to be described in further detail in connection with FIG. 7, displays to the operator the relationship of the data signals to acceptable limits stored in the data base unit 16 and upon an indication that the data signal pattern is considered normal or in other words acceptable, the operator can have the particular component machine under test classified as acceptable by so indicating through the operator input capability 18.

In the situation where the display of the relationship of the data signals to the limits is indicated to be other than acceptable the full diagnostic capability of the system is then employed using a second neural network in a serially applied series of diagnostic operations. The first diagnostic operation uses a comparison search for an exact signal match with known stored actual failure model signals, such as for a failed bearing in a previous testing operation. If a match is found the device under test is classified as defective with an identification of the defect. If no match is found, in a second diagnostic operation, a fuzzy logic computation is performed to establish and display for the operator the closest known pattern and degree of difference for a decision on classification of the device under test and an indication of the probable defect. If still no satisfying close data match has been found, an expert system is employed wherein the rules and facts stored in data base element 16 are processed with an inference and explanation subsystem in element 15 to arrive at the closest match in identifying the defect.

The operator using the input capability 18 receives sufficient information through the interface 13 to use the input capability to classify each failed device under test 5, with a defect and probable repair indication, and further to archive by storing in the data bases in element 16 the relationship of the signal pattern and the fault selected through the expert system for future use.

Much computation will be involved in applying the interaction of the diagnostic technologies in element 15 in the system in the processor element 3 with the neural network element 14. There are many variations of neural network configurations in the art. A preferred type involves the concept of adaptive resonance theory (ART) wherein the processing occurs in two modules, one for binary input patterns, the other for analog input patterns in relation to a target output that are linked by a MAP with a controller that controls the learning and the vigilance or degree of output precision. Adaptive resonance theory (ART) neural networks are described in the cross-referenced copending applications. In component machine testing where there may be many slightly different models of devices that at one time or another are to be tested, a neural network configuration that requires less expert attention from one test device model to another, such as the (ART) type is advantageous.

In overall operation, the testing system of FIGS. 1 and 2 collects continuous multiplexed operational data for evaluation through neural network processing. That operational vibration data contains a broad spectrum of data surrounding the critical data patterns that contain the information essential to the classification and evaluation operation. Advantages are gained by filtering, condensing and graphing the data with respect to both time and frequency in reducing computational resources, in extracting greater information, and, in improved communication with the operator through multiple simultaneous display.

The system requires some initialization.

The vibration data may contain filterable extraneous identifiable data that is not machine related and that can use up computational resources but can be removed by standard filtering techniques.

The continuous data stream is subjected to a standard sampling and framing operation that provides signal windows that contain all the essential data but are small enough for normal computational time. An ideal sampling operation will reflect all signal features in a minimum of points. The ideal frame will contain the entire sample but not more.

In the diagnostic technologies element 15, of the listed technologies, FFT and RMS are used extensively in the art and require no explanation; EWMA is described in the cross referenced copending applications. The auto regression (AR) technology requires that an AR order be modeled into a condensed and reordered sample of points in time order in which a low (AR) order usually results in a modeling of only the higher frequencies, a high (AR) order essentially includes all and may result in extensive marginally useful calculation, and a moderate (AR) order will provide the ability to include specific options. The (AR) order can be an integer between 7 and as many data points as are available in the analysis. For a machine component such as a transmission, a moderate (AR) order of 40 is preferred. Such (AR) order logs are stored in the data bases element 16 for use in neural network training.

Communication with the operator is enhanced where the information benefits in several types of vibration data signals are simultaneously available.

Figure 4:
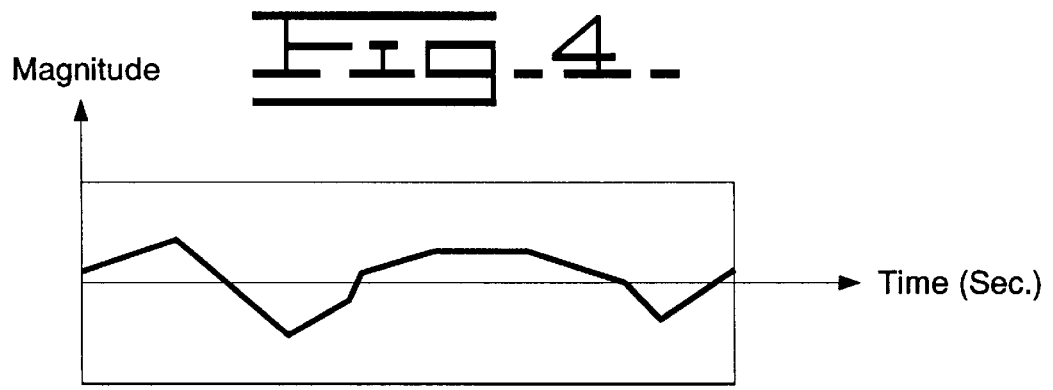
FIG. 4 is a depiction of a typical magnitude vs time (in seconds) graph of a typical vibration data signal following an autoregression data condensation operation.
Figure 5:
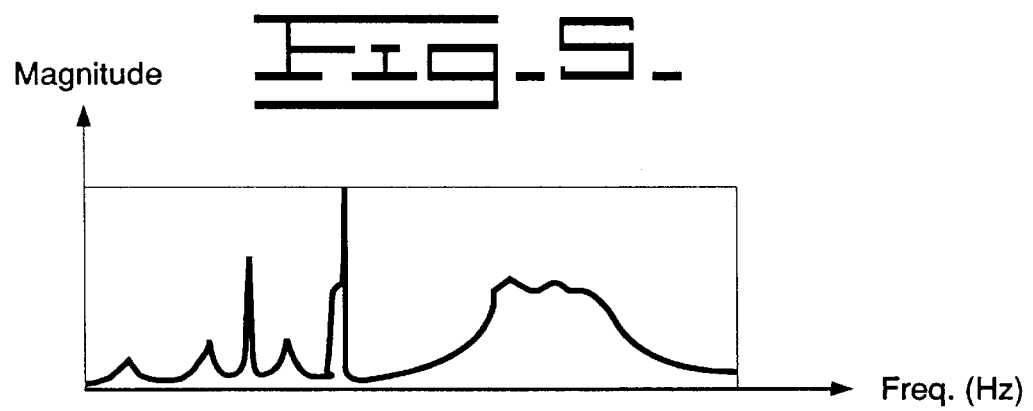
FIG. 5 is a depiction of a typical magnitude vs frequency (in Hz) graph of a typical vibration data signal following a fast fourier transform (FFT) data condensation operation.
Figure 6:
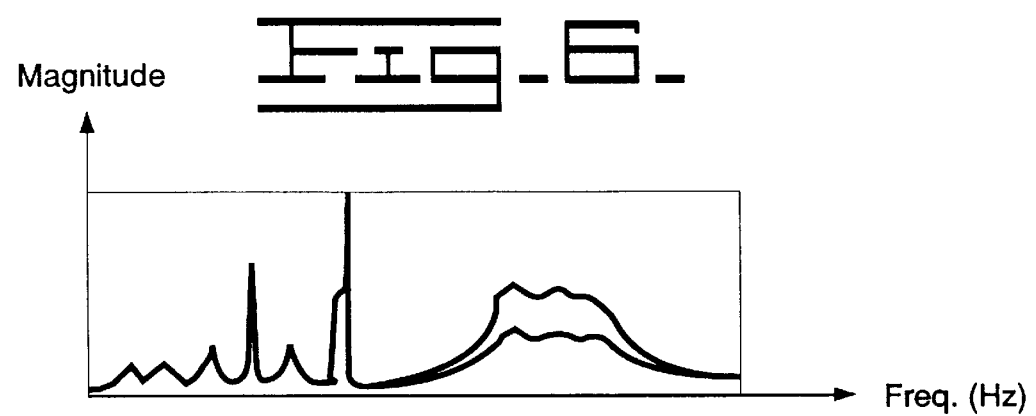
FIG. 6 is a depiction of a typical magnitude vs frequency (In Hz) graph of a typical autoregression vibration data signal as shown in FIG. 4, following the conversion of the points to a frequency based power spectral density (ARPSD) plot.

In FIGS. 3–6, there are shown graphs of several types of vibration data signals employed in the invention. Referring to FIGS. 3–6, in FIG. 3 there is shown a depiction of a magnitude vs time (in seconds) graph of a typical vibration data signal, separated by lines across the graph indicating sample frames. In FIG. 4 there is shown a depiction of a single frame of a magnitude vs time (in seconds) graph of the signal of FIG. 3, following an autoregression data condensation operation. In FIG. 5 there is shown a depiction of a single frame of a magnitude vs frequency (in Hz) graph of the vibration data signal of FIG. 3 following a fast fourier transform (FFT) data condensation operation. In FIG. 6, there is a depiction of a magnitude vs frequency (in Hz) graph of the autoregression vibration data signal as shown in FIG. 4, following the conversion of the points to a frequency based autoregression power spectral density (ARPSD) graph.

There are a number of features useful in the evaluation and diagnostics of a machine component that become available for decision making when combined time and frequency based graphing are displayed together and simultaneously. The time based autoregression type signal retains phase relationship while condensing data and illustrating inherent filtering. In vibration data a phase shift has been observed in vibration signals when rotating machinery is operating in an oil filled case as with a transmission.

The frequency based type graph captures magnitude and instantaneous power and in the presence of a time based graph filtered features become apparent. A display capability for all of the data evaluation types as depicted in FIGS. 4–6 enhances the ability of the operator to diagnose and classify and operators with differing ability are accommodated.

In FIG. 7, there is shown a depiction of the combined multiple simultaneous display capability and operator input capability of the interactive operator controlled interface of the invention. The interface provides diagnostic and warning level information to the operator and receives interactive diagnostic and classifying information for the system from the operator. Referring to FIG. 7, as part of the interface 13 of FIG. 2, there is a multiple feature simultaneous display capability 20, that is shown as an eight window 21–28 monitor, although it will be apparent that a separate monitor for each window could be employed. The display capability is positioned so as to be in view of an operator input capability 29, depicted, for example, as a keyboard. The window 21 displays the time based diagnostic system input vibration data signal. The window 22 displays an autoregression (AR) parameter graph of the signal of window 21. The window 23 displays an exponentially weighted moving average (EWMA) graph of the signal of window 21. The window 24 displays a root mean square (RMS) graph of the signal of window 21. The window 25 displays at least one element of data that would inform the operator of a change in condition of the machine such as temperature, pressure, and oil condition such as could be measured by a change in dielectric constant values. The window 26 displays a warning type communication that the data is indicating that limits are exceeded or are being approached and a decision may be required. Window 27 displays a fast fourier transform (FFT)

graph of the signal of window 21, and window 28 displays an autoregression power spectral density (ARPSD) graph of the signal of window 21.

The various signal types have the following usefulness to the operator. The signal in window 21 allows the operator to visualize the vibration data signal pattern. The signal in window 22 allows the operator to see a graph of a time based signal that contains phase relationship and also shows the signal that would be the diagnostic basis. The signal in window 23 allows the operator to see the current power in the vibration data signal in relation to historical trends and whether a condition just occurred or is rapidly getting worse. The signal in window 24 allows the operator to see the instantaneous power in the vibration data signal. The signal in window 25 allows the operator to see if there is any change in the steady state operating conditions of the equipment involved. The signal in window 26 usually contains indicators that summarize the other signal graphs and an indication of the seriousness of the problem such as a red light for exceeding a limit, a yellow light for proximity to a limit and a green light for being satisfactory. The signal in windows 27 and 28 allows the operator to simultaneously use a time based and a frequency based graph of the vibration data signal pattern. Many defects can be determined from the window 27 and 28 displays alone which permits diagnostics and classification with less processing and efficient use of operators with different levels of skill. In the situation of a component machine such as a transmission provision in the display to indicate a particular gear could be included.

In FIG. 8, there is shown a depiction of the background vibration signal extraction first neural network unit of the invention. In FIG. 8, the first neural network signal extraction unit 30 includes an input layer 31 and an output layer 32 of neural processor summing devices in a quantity corresponding to a selected data signal sampled pattern of which an example six input-output paths 33–38 are shown.

Each input device in layer 31 is connected to each output device in layer 32 and each output device in layer 32 is connected to each input device in layer 31 through standard in the art weighted interconnections.

The function of the extraction neural network unit 30 is to have the subsequent processing of the vibration data signals in the processor 14 of FIG. 2 recognize the background data signals as being normal signals. Processing is then focused on the test device data signals.

The background data signal pattern via channel 10 of FIG. 2 is applied to the terminals 39–44 through a standard in the art autoregression technique labeled element 45, such as is described in detail in the cross referenced copending applications. Forward and backward (AR) order parameters corresponding to upper and lower limiting autoregression parameters are established and applied to input terminals 46–51. Each input node in layer 31 begins generating a signal proportional to its input. Each output node in layer 32 receives signals from the input layer 31 adjusted by the strength of the interconnections and each output layer node returns a signal to all of the input layer 31 notes via another set of connections, thereby setting up a resonance between layers 31 and 32. A trigger level is provided by a vigilance factor 52. The vigilance factor 52 determines how many output signals are required in order to have a signal pattern satisfy the autoregression parameter limits. An example of five of the six paths 33–38 are shown as an example at terminals 53–57 which in turn are connected through channel 12 of FIG. 2 into the processor 14.

If the vigilance factor in element 52 is high, the network unit 30 iterates for long periods in searching for an exact match whereas if the vigilance factor is too low, the network unit 30 would consider too much of the background vibration to be abnormal and would use up too much of the network computation resources. The vigilance factor 52 is a number between 1 and 10 with 5 being satisfactory in this application.

The result of the preprocessing of element 30 is that in the vibration data signal delivered to the processor 3 via the channel 12, the influence of the background environment signal has been neutralized as being a normal condition.

INDUSTRIAL APPLICABILITY

What has been described is a component machine testing technique that performs diagnostic analysis on a vibration signal of the component machine that has had the influence of power and load machine background noise extracted in a first neural network. In a diagnostic analysis, with operator direction, through an interactive interface, a second neural network is used to provide a serial series of diagnostic approaches in categorizing the component machine and directing action with respect to it, followed by archival of any experience acquired in the testing operation being performed.

Other aspects, objects, and features of the present invention can be obtained from a study of the drawings, the disclosure, and the appended claims.

I claim:

1. Apparatus for evaluation and diagnostics of a component machine that is part of a larger machine where the diagnostics and evaluation are through neural network analysis of a vibration data signal to identify abnormal signal patterns in said vibration data, comprising in combination:

first sensing means positioned for sensing vibration data signals produced by said component machine;

second sensing means positioned separate from said first sensing means for sensing background noise vibration data in the vicinity of said component machine;

first neural network preprocessing means for rendering as normal any influence of said sensed background noise in said sensed component machine vibration data signals; and a processing stage for evaluation and diagnostics, said processing stage including:

an interactive interface member having at least the features of simultaneous multiple signal display and operator input and means for receiving said preprocessed component machine vibration data signal, and, a second neural network with associated diagnostic technology operating systems and supporting data bases for evaluation and processing determinations based on signal patterns in said component machine vibration data signal identified in said second neural network.

2. The apparatus of claim 1 wherein said rendering as normal any influence of said sensed background noise in said sensed component machine vibration data signals in said first neural network is by autoregression parameter selection.

3. The apparatus of claim 1 wherein said multiple display is a multiple window computer monitor.

4. The apparatus of claim 1 wherein said first and second sensing means each involve accelerometer devices.

5. The apparatus of claim 1 wherein said operator input means is a keyboard.

6. The method of evaluation and diagnostics of a component machine that is part of a larger machine where the diagnostics and evaluation are through neural network analysis of vibration data signals to identify abnormal signal patterns, comprising in combination the steps of:

sensing vibration data signals at the location of a component machine;

sensing background noise vibration data signals at a location in the vicinity of said component machine;

providing a first neural network preprocessor for rendering as being normal any influence of said sensed background noise in said sensed component machine vibration data signals by autoregression parameter selection; and, processing said sensed component machine vibration data signals for evaluation and diagnostics, said processing including viewing a simultaneous multiple signal display and inputting responses based on information in said display.

7. The method of claim 6 wherein including the step of providing a multiple window computer monitor as said multiple display.

8. The method of claim 6 including the step of providing accelerometer devices for said first and second sensing means.

9. The method of claim 6 including the step of providing a keyboard for said operator input means.

10. A vibration data processing element for extracting background vibration signals from specific vibration signals that originate at a specific source and are subsequently processed in a neural network, comprising in combination:

means for sensing in a first sensing unit said specific vibration signals at a first location said first location being adjacent to said specific source of said specific vibration signals;

means for sensing in a second sensing unit said background vibration signals, said second sensing unit being positioned separate and remote from said source of specific vibration signals;

means involving autoregression for producing a minimum and maximum expectation signal representing said background vibration signals in said sensed background vibration signals and deriving therefrom normal expectation range signals;

a neural network member;

said neural network member having an input layer of processing elements each with an input terminal, each said input terminal being supplied with an expectation range signal from said expectation range signals;

said neural network member having an output layer of processing elements each with an output terminal;

each said processing element in said input layer being connected to each said processing element in said output layer; and, each said processing element in said output layer being connected to each said processing element in said input layer; and, a vigilance stage positioned between each said output terminal and a corresponding input terminal of said subsequent neural network processing, said stage being responsive to a vigilance factor and operable to pass output signals based on a required portion of all possible output signals at said output terminals.

11. An apparatus for diagnostics and evaluation of a machine through neural network analysis of a vibration data signal of said machine to identify abnormal signal patterns, the improvement comprising;

a vibration data signal preprocessing stage including a neural network with selected autoregression and vigilance factors operable to identify specific vibration data signal patterns in said vibration data signal as being normal.

12. The apparatus of claim 11 where said autoregression factor ranges from 7 to the maximum length of analysis and said vigilance factor ranges between 0 and 1 with complete user selectability.

13. In a system in which vibration data from a machine is assembled and then processed through a neural network processor in diagnostic and evaluation determinations of said machine;

an interface for operator interaction with said system positioned in said system between the input of said vibration data and said processor, comprising in combination;

input means adapted for manual entry of operator direction into said system; and, display means including a plurality of at least two separate data signal display capabilities and a separate condition indicator display capability, said display means being positioned within operator view when said operator is within reach of said input means.

14. The interface of claim 13 wherein said at least two separate display capabilities include time based and frequency based vibration data signals.

15. The interface of claim 13 wherein said separate display capabilities include the time based diagnostic system input vibration data signal, an autoregression (AR) parameter graph of said signal, a fast fourier transform (FFT) graph of said signal, an autoregression power spectral density (ARPSD) graph of said signal, an exponentially weighted moving average (EWMA) graph of said signal, a root mean square (RMS) graph of said signal, at least one condition monitor signal of said machine taken from the group of temperature, pressure, and oil dielectric constant values and said condition indicator.

* * * * *